(12) United States Patent
Burns

(10) Patent No.: US 6,535,320 B1
(45) Date of Patent: Mar. 18, 2003

(54) TRAVELING WAVE, LINEARIZED REFLECTION MODULATOR

(75) Inventor: William K. Burns, Alexandria, VA (US)

(73) Assignee: The United States of America as represented by The Secretary of The Navy, Washington, DC (US)

( * ) Notice: Subject to any disclaimer, the term of this patent is extended or adjusted under 35 U.S.C. 154(b) by 0 days.

(21) Appl. No.: 09/663,135

(22) Filed: Sep. 15, 2000

(51) Int. Cl.[7] .............................. G02F 1/03; G02F 1/07; G02B 6/12; G01B 9/02
(52) U.S. Cl. ........................ 359/245; 359/254; 385/2; 356/477
(58) Field of Search ............................ 385/14, 2, 3, 4, 385/40, 1, 16, 12; 359/188, 173, 245, 251, 254, 238; 356/481, 477

(56) References Cited

U.S. PATENT DOCUMENTS

| 5,091,981 A | | 2/1992 | Cunningham .................. 395/3 |
| 5,249,243 A | * | 9/1993 | Skeie ............................ 385/3 |
| 5,253,309 A | | 10/1993 | Nazarathy et al. ............. 385/4 |
| 5,339,369 A | | 8/1994 | Hopfer et al. ................. 385/2 |
| 5,347,601 A | * | 9/1994 | Ade et al. ...................... 385/3 |
| 5,377,008 A | * | 12/1994 | Ridgway et al. ............ 356/481 |
| 5,422,966 A | | 6/1995 | Gopalakrishnan et al. ..... 385/2 |
| 5,548,668 A | | 8/1996 | Schaffner ....................... 385/1 |
| 5,615,037 A | * | 3/1997 | Betts et al. ................. 359/188 |
| 5,867,295 A | * | 2/1999 | Betts ........................... 359/173 |
| 5,886,807 A | | 3/1999 | Cummings .................. 359/263 |
| 5,920,666 A | * | 7/1999 | Digonnet et al. ............. 385/16 |
| 6,016,198 A | * | 1/2000 | Burns et al. ................. 356/477 |
| 6,288,823 B1 | * | 9/2001 | Taylor ........................ 359/251 |
| 6,301,399 B1 | * | 10/2001 | Mahapatra et al. ............ 385/2 |

* cited by examiner

*Primary Examiner*—Georgia Epps
*Assistant Examiner*—Omar Hindi
(74) *Attorney, Agent, or Firm*—John J. Karasek; Dorothy I. Becker

(57) ABSTRACT

A traveling wave, linearized, modulator device includes: an optical waveguide disposed on a substrate and consisting of an input-output portion, a terminal portion and a plurality of arms disposed between and connected to the other portions. A first arm has an optical characteristic that varies responsive to supplying of an electric field thereto. A reflector (e.g., mirror) located at the distal end of the terminal portion of the optical waveguide causes light entering the input-output portion and propagating through the waveguide to be reflected back through the waveguide so as to exit through the input-output portion. A traveling wave electrode structure disposed on the substrate terminates in an open circuit substantially at the distal end of the terminal portion of the waveguide. The electrode structure includes an electrode disposed on the first arm so as to supply an electric field to that arm responsive to an electrical voltage being supplied to the electrode. A radio frequency signal and a direct current bias are supplied to the first electrode such that the radio frequency signal is biased at a non-quadrature, preferably 104.5 degree, bias point providing minimum third-order distortion, thereby providing substantially linearized modulator operation.

7 Claims, 1 Drawing Sheet

TRAVELING WAVE, LINEARIZED REFLECTION MODULATOR

FIELD OF THE INVENTION

The present invention relates to linearized Mach Zehnder amplitude modulators and interferometers and, more particularly, to an improved linearized Mach Zehnder amplitude modulator wherein the operating frequency thereof is extended into the tens of GHz range.

BACKGROUND OF THE INVENTION

In the reference Betts et al., "Sub-Octave-Bandwidth Analog Link using Linearized Reflective Modulator," Fifth Annual ARPA Symposium on Photonic Systems, January 1995, there is described a linearized Mach Zehnder interferometer that operates in a double pass, reflection mode. As stated in that reference, optical analog links for antenna remoting applications often require both a large linear dynamic range and a low noise figure. Most of such links need less than one octave bandwidth because antennas are bandpass devices. The Betts et al interferometer basically comprises two standard Mach Zehnder interferometric modulators connected in series and optimized for exactly these criteria. A schematic diagram of a preferred implementation thereof is shown in FIG. 1.

Referring to FIG. 1, an optical analog link is shown which includes a laser 10, an optical circulator 12, a detector 14 connected to an RF output terminal 16, and a linearized modulator device 18. The light output is obtained through the optical circulator 12 (at terminal 3) and passes to detector 14. The modulator device 18 represents a simplification of the basic modulator described above wherein, in essence, the two modulator construction is cut in the middle, one of the modulators is discarded, and a mirror is added. As illustrated, the result is a single modulator 22 in combination with a mirror 20 disposed so that light passes through the modulator 22 twice, effectively duplicating the two modulator construction, while requiring only a single RF drive. In FIG. 1, the RF drive input and bias input are indicated at terminal 24 which is connected to the modulator electrode structure, indicated schematically by an electrode 26 formed by a metal strip. The complete electrode structure also comprises a ground plane formed by a second metal strip (not shown). In the Betts et al reference, the modulator bias point provided at terminal 24 is 104.5°, rather than the conventional 90° or quadrature point, in order to provide minimum third-order distortion. In this regard, it will be appreciated that because the Betts et al reference is concerned with single octave linearity, second-order distortion, while present, is out of band and is thus ignored.

In summary, in the linearized modulator of the Betts et al reference, the optical signal is reflected upon itself by mirror 20 so as to traverse the interferometer 22 in the opposite direction. By adjusting the bias voltage applied to input 24 at a particular point (104.5 degrees), linearized operation is achieved. This can be contrasted with the operation of a conventional single pass interferometer operated at the 90 degree or quadrature point. Such a 90 degree bias point would not provide linearized operation in the modulator of FIG. 1.

A disadvantage of the interferometer described in the Betts et al reference is that the device is essentially limited to operation at a few hundred MHz. This limitation on the operation can be traced to the electrode structure used, i.e., the use of resistive-capacitive (RC) electrodes. With an RC limited electrode structure, above a few hundred MHz the electrical phase changes while the optical signal or beam travels beyond the electrode structure 26 to the mirror 20. This is a serious limitation in that some important applications (e.g., cellular telephones) require such a device to operate in the bands 800–1000 MHz and 1800–2200 MHz.

SUMMARY OF THE INVENTION

In accordance with the invention, a traveling wave, linearized, reflection modulator is provided which can operate in the tens of GHz range and up to about 100 GHz with proper design. At low frequencies (i.e., less than 500 MHz) the drive voltage required should also be reduced as compared with the prior art RC limited electrical structure described above, because the reflected field will, as explained below, double the total field until propagation effects become important. As indicated previously, in the prior art RC limited electrode structure discussed above, electrical phase error limits the linearization beyond a few hundred MHz because the electrical phase changes while the optical beam travels beyond the electrode structure to the reflecting mirror. As will appear, this effect does not occur in the traveling wave implementation provided in accordance with the present invention because of the electrical-optical match provided by the invention and because the electrical and optical pathlengths are essentially the same.

In accordance with the invention, a traveling wave, linearized, modulator device is provided which comprises: an electro-optical modulator comprising a substrate; an optical waveguide disposed on said substrate and comprising an input-output portion, a terminal portion having a distal end and a plurality of arms disposed between, and connected to, the input-output portion and terminal portion, the arms being offset with respect to the input-output portion and the terminal portion and extending parallel to each other, and at least a first one of the arms having an optical characteristic that varies responsive to supplying of an electric field thereto; a reflective means, located at the distal end of the terminal portion of the optical waveguide, for causing light entering the input-output portion and propagating through said optical waveguide to be reflected back through the optical waveguide so as to exit through the input-output portion; and a traveling wave electrode structure disposed on the substrate and terminating in an open circuit substantially at the distal end of the terminal portion of the optical waveguide, the electrode structure including an electrode disposed on the first arm of the plurality of optical waveguide arms so as to supply an electric field to the first arm responsive to an electrical signal being supplied to the electrode; and means for supplying a radio frequency electrical signal and a direct current bias to the first electrode such that the radio frequency signal is biased at a non-quadrature bias point providing minimum third-order distortion, thereby providing substantially linearized modulator operation.

Advantageously, the bias point is set between 100° and 110°. Preferably, the bias point is set at 104.5°.

Preferably, the electrode structure further includes a second electrode disposed on a second arm of said plurality of arms. Advantageously, the electrode structure further includes a third electrode disposed in an area of the substrate spaced from the plurality of arms so as to not overlay or be disposed on any of the arms. The second and third electrodes are preferably connected to ground. The reflective means preferably comprises a reflective coating disposed at the distal end of the terminal portion of the optical waveguide.

Further features and advantages of the present invention will be set forth in, or apparent from, the detailed description of preferred embodiments thereof which follows.

DESCRIPTION OF THE PREFERRED EMBODIMENTS

Figure 1:
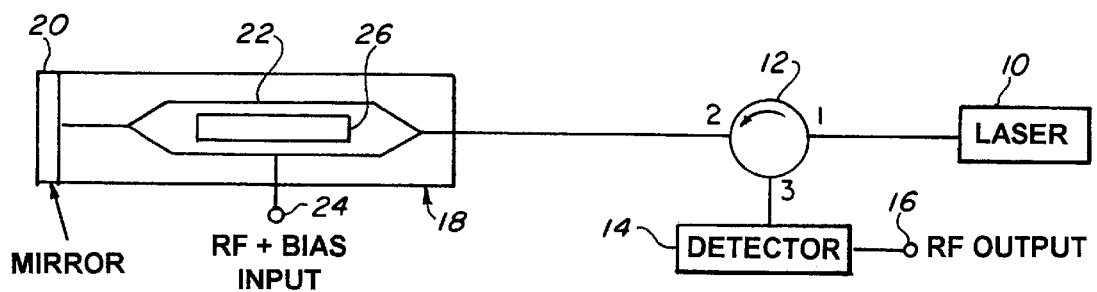
FIG. 1 is, as discussed above, a schematic-block diagram of an optical analog link including a prior art linearized reflective modulator.
Figure 2:
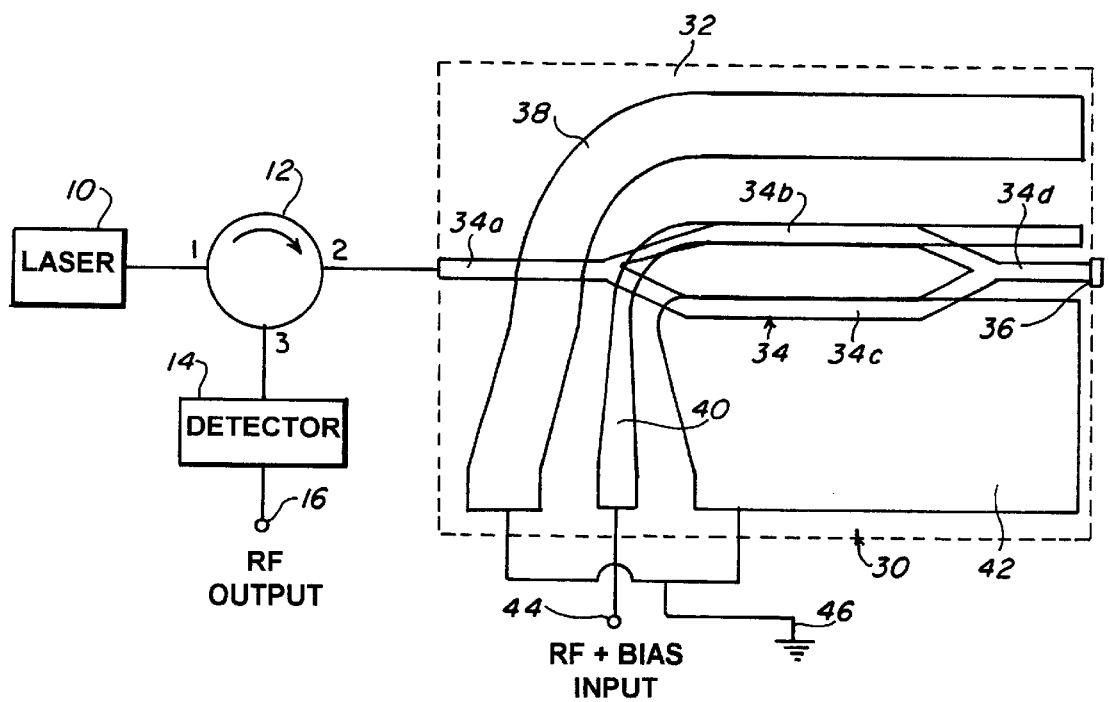
FIG. 2 is a schematic-block diagram of a similar analog link which includes a preferred embodiment of the traveling wave, linearized, reflective modulator device of the invention.

Referring to FIG. 2, there is shown a preferred embodiment of the traveling wave, linearized, reflective modulator device of the invention. The modulator device, which is generally denoted 30, is shown as being connected in a link similar to that of FIG. 1 and other corresponding units or elements of the link (the laser, optical circulator and detector) have been given the same reference numerals.

The modulator device 30 includes a substrate 32, preferably made of LINbO$_3$, having formed thereon an optical waveguide 34. The optical waveguide 34, which is preferably a single-mode waveguide, includes a linear input-output portion 34a, offset, parallel waveguide arm portions or arms 34b and 34c and a further linear, terminal portion 34d. A reflective coating 36 is formed at the distal end of optical waveguide 34. Three electrodes 38, 40 and 42 of the shapes shown and fabricated, e.g., of gold, are also provided on substrate 32. More particularly, a buffer layer (not shown) is conventionally disposed above the optical waveguide 34, and electrodes 38, 40 and 42 are formed on this buffer layer so that electrode 40 overlays optical waveguide arm portion 34a and electrode 42 overlays optical waveguide arm portion 34b. Electrode 38 is spaced from and does not overlay either of the optical waveguide arms 34a and 34b. Electrodes 38, 40 and 42 form a microwave transmission line which is open-ended or open circuited in the vicinity of reflective coating 36. Electrode 40 is connected to an electrical input terminal 44 while electrodes 38 and 42 are grounded, i.e., are connected to a ground indicated at 46. These connections can be made through a coaxial connection (not shown), any other suitable connector (not shown) or a hard-wired attachment (not shown).

Terminal 44 receives a radio frequency (RF) signal and bias input signal or voltage, as described above in connection with FIG. 1. The bias input set signal provides a bias point or operating point for the RF signal. In contrast to conventional systems which employ a quadrature or 90 degree bias point, the bias input provides a non-quadrature modulator bias point, preferably at 104.5 degrees.

Electrodes 38, 40 and 42 form a traveling wave electrode structure or coplanar waveguide which is terminated, as indicated above, by an open circuit in the vicinity of, very close to, the reflective coating 36 that provides reflection of the optical beam. As explained below, while this termination point must be close, the microwave reflections do not have to occur at precisely the same point as the optical reflections.

It is noted that a reflective Mach-Zehnder interferometer having electrodes configured to act as a microwave transmission line is disclosed in U.S. Pat. No. 6,016,198 to Burns et al and reference is made to that patent as well as to U.S. Pat. No. 5,415,850 to Burns et al, to Gopalakrishnan et al, Performance and Modeling and Broadband LiNbO$_3$ Traveling Wave Intensity Modulators, *Journal of Lightwave Technology*, Vol. 12, No. 10, October, 1994, pp. 1807–1819, and to Gopalakrishnan et al., 40 GHz, Low Half-Wave Voltage Ti:LiNbO$_3$ Intensity Modulator, *Electronics Letters*, Volume 28, No. 9, Apr. 23, 1992, pp. 826–7, for a further description of electro-optic amplitude modulators with a traveling-wave electrode structure. These four references are hereby incorporated by reference in their entirety.

The reflecting electrode structure of FIG. 2 formed by electrodes 38, 40 and 42 is designed so that the modulator device 30 is velocity matched, i.e., the electrical and optical waves travel with the same phase velocity. The optical and electrical wavefronts entering device 30 thus maintain the same phase relationship traveling into the device and, after reflection at mirror 36, traveling out of the device in the opposite direction. Because the microwave wavelengths are large (about 1 cm.) as compared to the optical wavelengths (about 1 micron), the reflections do not have to occur at exactly the same point. As was indicated above, in this regard, the reflections can be a few hundred microns apart and the optical signal will still see essentially the same phase of the microwave signal. The configuration of FIG. 2 thus allows a velocity matched interaction between the same optical and electrical fields in both directions through the device and there is no phase delay between the fields introduced into the device 30.

It is noted that the modulator device of the invention can be operated to about 100 GHz. As indicated hereinbefore at low frequencies, i.e., frequencies less than about 500 MHz, the drive voltage required is reduced as compared to the RC limited structure of the device of FIG. 1 because the reflected electric field will double the total electric field until propagation effects become important. As stated above, with the RC limited electrode structure, electrical phase error limits the linearization beyond a few hundred MHz because the electrical phase changes during the period when the optical signal travels beyond the electrode structure to the mirror. This effect does not occur with the traveling wave implementation provided in accordance with the invention because of the electrical-optical velocity match described above, and the fact that the electrical and optical path lengths from the end of the modulator 22 to the mirror 20 and back from mirror 22 to the end of the modulator 22 are essentially the same. This enables operation of the modulator device at high frequencies.

Although, as previously indicated, in a preferred embodiment, the modulator 30 is a LiNbO$_3$ type integrated optical modulator, the invention is applicable to other devices using other materials. Further, although the microwave waveguides 38, 40 and 42 are shown as coplanar waveguides, coplanar strip waveguides can also be used. Further, a microwave isolator (not shown) can be used at the input to modulator device 30 to absorb back reflected power. It is also noted that the electrode structures shown in FIG. 2 are for z-cut devices which use vertical field components and that for x-cut devices the waveguides would lie in the electrode gaps and use horizontal field components. Of course, the invention is applicable to either structure and to any cut of LiNbO$_3$ or other material.

Although the invention has been described above in relation to preferred embodiments thereof, it will be understood by those skilled in the art that variations and modifications can be effected in these preferred embodiments without departing from the scope and spirit of the invention.

What is claimed is:

1. A traveling wave, linearized, modulator device comprising:

an electro-optical modulator comprising a substrate; an optical waveguide disposed on said substrate and comprising an input-output portion, a terminal portion having a distal end and a plurality of arms disposed between and connected to said input-output portion and said terminal portion, said arms being offset with respect to said input-output portion and said terminal portion and extending parallel to each other, and at least a first one of said arms having an optical characteristic that varies responsive to supplying of an electric field thereto; a reflective means located at the distal end of said terminal portion of said optical waveguide for causing light entering said input-output portion and propagating through said optical waveguide to be reflected back through the optical waveguide so as to exit through said input-output portion; and a traveling wave electrode structure disposed on said substrate and terminating in an open circuit substantially at the distal end of said terminal portion of the optical waveguide, said electrode structure including an electrode disposed on said first arm of said plurality of optical waveguide arms so as to supply an electric field to said first arm responsive to an electrical voltage being supplied to said electrode, said open circuit and said electrode structure matching velocities of an electrical and an optical waveform both as said light enters said waveguide and as said light is reflected back out of said waveguide; and means for supplying a radio frequency signal and a direct current bias to said first electrode such that the radio frequency signal is biased at a non-quadrature bias point providing minimum third-order distortion, thereby providing substantially linearized modulator operation.

2. A device according to claim 1 wherein said bias point is set between 100° and 110°.

3. A device according to claim 2 wherein said bias point is set at 104.5°.

4. A device according to claim 3 wherein said electrode structure further includes a second electrode disposed on a second arm of said plurality of arms.

5. A device according to claim 4 wherein said electrode structure further include a third electrode disposed in an area of said substrate spaced from said plurality of arms.

6. A device according to claim 5 wherein said second and third electrodes are connected to ground.

7. A device according to claim 6 wherein said reflective means comprises a reflective coating disposed at the distal end of said terminal portion of said optical waveguide.

* * * * *